(12) United States Patent
Sultan et al.

(10) Patent No.: US 11,884,022 B2
(45) Date of Patent: Jan. 30, 2024

(54) METHOD AND SYSTEM FOR ENHANCING THE LIFETIME OF PRINTING HEADS USED IN ADDITIVE MANUFACTURING

(71) Applicant: STRATASYS LTD., Rehovot (IL)

(72) Inventors: Shai Sultan, Moshav Ganei Tal (IL); Shmuel Rubin, Moshav Tkuma (IL)

(73) Assignee: STRATASYS LTD., Rehovot (IL)

( * ) Notice: Subject to any disclaimer, the term of this patent is extended or adjusted under 35 U.S.C. 154(b) by 257 days.

(21) Appl. No.: 17/416,528

(22) PCT Filed: Dec. 25, 2019

(86) PCT No.: PCT/IL2019/051411
§ 371 (c)(1),
(2) Date: Jun. 21, 2021

(87) PCT Pub. No.: WO2020/136651
PCT Pub. Date: Jul. 2, 2020

(65) Prior Publication Data
US 2022/0072799 A1 Mar. 10, 2022

Related U.S. Application Data

(60) Provisional application No. 62/784,852, filed on Dec. 26, 2018.

(51) Int. Cl.
*B29C 64/393* (2017.01)
*B33Y 30/00* (2015.01)
(Continued)

(52) U.S. Cl.
CPC ............ *B29C 64/393* (2017.08); *B29C 64/35* (2017.08); *B33Y 30/00* (2014.12); *B33Y 40/00* (2014.12); *B33Y 50/02* (2014.12)

(58) Field of Classification Search
CPC ....... B29C 64/393; B29C 64/35; B33Y 30/00; B33Y 40/00; B33Y 50/02
(Continued)

(56) References Cited

U.S. PATENT DOCUMENTS

| 6,259,962 B1 | 7/2001 | Gothait |
| 6,569,373 B2 | 5/2003 | Napadensky |

(Continued)

FOREIGN PATENT DOCUMENTS

| CN | 2900196 Y | 5/2007 |
| CN | 105383058 A | 3/2016 |

(Continued)

OTHER PUBLICATIONS

Office Action dated Sep. 30, 2022 for CN Application No. 2019800931019.
(Continued)

*Primary Examiner* — Joseph S Del Sole
*Assistant Examiner* — Lawrence D. Hohenbrink, Jr.
(74) *Attorney, Agent, or Firm* — PEARL COHEN ZEDEK LATZER BARATZ LLP (57) ABSTRACT

Methods and systems (100) of printing a 3D object (101) comprising: depositing material, layer by layer, via printing heads (72) comprising one or more nozzle arrays; and activating each of said printing heads (72) to dispense a building material (50) at least once within a specified period of time during printing.

19 Claims, 4 Drawing Sheets

(51) Int. Cl.
*B33Y 40/00* (2020.01)
*B33Y 50/02* (2015.01)
*B29C 64/35* (2017.01)

(58) Field of Classification Search
USPC .......................................................... 425/162
See application file for complete search history.

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 6,863,859 B2 | 3/2005 | Levy |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,500,846 B2 | 3/2009 | Eshed et al. |
| 7,991,498 B2 | 8/2011 | Kritchman |
| 9,031,680 B2 | 5/2015 | Napadensky |
| 2005/0069784 A1 | 3/2005 | Gothait et al. |
| 2006/0054039 A1 | 3/2006 | Kritchman et al. |
| 2016/0339643 A1 | 11/2016 | Dikovsky et al. |
| 2017/0320268 A1* | 11/2017 | Teken ................... B29C 64/106 |

FOREIGN PATENT DOCUMENTS

| | | |
|---|---|---|
| CN | 107107462 A | 8/2017 |
| CN | 107864639 A | 3/2018 |
| CN | 108016132 A | 5/2018 |
| EP | 2572865 | 3/2013 |

OTHER PUBLICATIONS

International Search Report dated Apr. 22, 2020 for corresponding PCT Application No. PCT/IL2019/051411.

* cited by examiner

METHOD AND SYSTEM FOR ENHANCING THE LIFETIME OF PRINTING HEADS USED IN ADDITIVE MANUFACTURING

RELATED APPLICATION

This application is a National Phase Application of PCT International Application No. PCT/IL2019/051411, International Filing Date Dec. 25, 2019, claiming the benefit of U.S. Provisional Patent Application No. 62/784,852, filed Dec. 26, 2018, which are hereby incorporated by reference in their entirety.

TECHNICAL FIELD

The present invention relates to the field of Additive Manufacturing (AM), and more particularly, but not exclusively, to systems and methods for enhancing the reliability and lifetime of 3D inkjet printing heads of three-dimensional (3D) inkjet printers.

BACKGROUND OF THE INVENTION

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a printing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, 7,500,846, 7,991,498 and 9,031,680 and U.S. Published Application Nos. 20160339643 and 20060054039, all by the same Assignee, and being hereby incorporated by reference in their entirety.

3D inkjet printers usually dispense building material in a liquid form via one or more printing heads and then solidify the material to define the shape of the object. The liquid may be, for example, a photocurable liquid, e.g., a photopolymerizable formulation deposited on a printing tray and polymerized and/or solidified through exposure to radiation, such as ultraviolet (UV) radiation. Typically, printing heads eject small drops of a building material via nozzles having small apertures susceptible to clogging. When one or more nozzles is clogged, these nozzles are no longer available (i.e. disabled) for depositing the building material and the whole printing process may be severely affected thereby reducing the printing quality of the object being built. In most cases, replacement of the damaged printing head is required to restore the full functionalities of the printer, and if done frequently, the overall printing costs may be substantially affected.

SUMMARY OF THE INVENTION

One aspect of the present invention provides a method of 3D inkjet printing comprising: depositing building material/s, layer by layer via a plurality of inkjet printing heads, to form a 3D object having a bulk and a surface layer, wherein at least the surface layer of the 3D object being printed is deposited according to a given CAD model of the 3D object, and wherein during the deposition of the building materials to form the bulk, switching among the printing heads to operate each of the printing heads at least once within a specified period.

One aspect of the present invention provides a method of 3D inkjet printing comprising: depositing building material/s, layer by layer via a plurality of inkjet printing heads, to form a 3D object having a bulk and a surface layer, and one or more support constructions for supporting and/or improving or affecting surface characteristics of the 3D object, wherein at least the surface layer of the 3D object being printed is deposited according to a given CAD model of the 3D object, and wherein during the deposition of the building materials to form the bulk, surface layer and support construction/s, switching among the printing heads to operate each of the printing heads at least once within a specified period.

One aspect of the present invention provides a 3D-printing system comprising a plurality of printing heads configured to deposit building material/s, layer by layer and controllably by a controller, to form a 3D object having a bulk and a surface layer, and optionally one or more support constructions for supporting and/or improving or affecting surface characteristics of the 3D object, wherein at least the surface layer of the 3D object being printed is deposited according to a given CAD model of the 3D object, and wherein the controller is configured to switch among the printing heads during the deposition of the modeling material to form the bulk, surface layer and support construction/s to operate each of the printing heads at least once within a specified period.

One aspect of the present invention provides a method of printing a 3D object including depositing building material, layer by layer, via printing heads comprising one or more nozzle arrays; and activating each of the printing heads to dispense a building material at least once within a specified period of time during said printing.

In some embodiments, activating a printing head is made by depositing a building material from all the nozzles, from part of the nozzles, or from a nozzle array of the printing head. In some embodiments, the specified period of time is the time necessary for a printing block comprising the printing heads to perform a full scan or pass over the building tray, the time necessary to build one layer of said 3D object, the time necessary to build a specific number of layers of the 3D object (e.g. a specific number of layers being equal or inferior to the number of printing heads or the number of nozzles arrays), the time necessary to build said 3D object, less than 5 minutes, less than 1 minute and less than 30 seconds.

The 3D object may comprise a bulk region and a surface region. In some embodiment, the building material of the surface region is deposited according to data provided by a computer assisted design (CAD) file, and wherein the building material forming the bulk region is deposited so that each of said printing heads is activated at least once within a specified period of time. In some embodiments, a portion of the building material of the bulk region is deposited by a printing head selected according to data provided by a CAD file, and another part of the building material of the bulk region is deposited by a printing head which is not selected according to said data. In some embodiments, the printing heads include a printing head comprising a support material and a plurality of printing heads comprising a modeling material, and each of the printing heads comprising a modeling material is activated to form a layer of the bulk region. In some embodiments, each of the printing heads comprising a modeling material is activated according to a specific sequence. In some embodiments, said specific sequence is a serial order so that a printing head activated to form a layer of the bulk region is activated to form another layer of the bulk region only once all the other printing heads comprising a modeling material have been activated to form a layer of the bulk region. In some other embodiments, the specific sequence is a random order.

In some embodiments, the method of the invention comprises forming a support construction for supporting the 3D object during printing. In some embodiments, a portion of the building material of the support construction is deposited by a printing head that dispenses a modeling material. In some embodiments, a portion of the building material is deposited at a location outside of the 3D object and the support construction for instance a location on the printing tray where no 3D object is printed or at a purging station or at a service station.

One aspect of the present invention provides a computer program product comprising a non-transitory computer readable storage medium having a computer readable program configured to carry out a method as described above. Another aspect provides a 3D printing system comprising the computer readable program product of claim mentioned above.

One aspect of the present invention provides a 3D printing system including a controller and printing heads comprising one or more nozzle arrays, and being configured to form a 3D object by depositing a building material, layer by layer, and wherein the controller is configured to activate each of the printing heads to dispense a building material at least once within a specified period of time during said printing.

In some embodiments, the controller is configured to activate all of the nozzles of a printing head, at least part of the nozzles of a printing head, or a nozzle array of a printing head. In some embodiments, the specified period of time is the time necessary for a printing block comprising the printing heads to perform a full scan or pass over the building tray, the time necessary to build one layer of said 3D object, the time necessary to build a specific number of layers of the 3D object (e.g. a specific number of layers being equal or inferior to the number of printing heads or the number of nozzles arrays), the time necessary to build said 3D object, less than 5 minutes, less than 1 minute and less than 30 seconds.

The 3D object may comprise a bulk region and a surface region. In some embodiments, the controller is configured to activate the printing heads to deposit a building material to form the surface region according to data provided by a CAD file, and is further configured to activate the printing heads to deposit a building material to form the bulk region so that each of the printing heads is activated at least once within a specified period of time. In some embodiments, the controller is configured to activate the printing heads to deposit a building material to form a portion of the bulk region according to data provided by a CAD file, and is further configured to activate said printing heads to deposit a building material to form another part of the bulk region without relating to said data. In some embodiments, the printing heads include a printing head comprising a support material and a plurality of printing heads comprising a modeling material, and the controller is configured to activate each of the printing heads comprising a modeling material to form a layer of the bulk region. In some embodiments, each of the printing heads comprising a modeling material is activated according to a specific sequence. In some embodiments, the specific sequence is a serial order so that a printing head activated to form a layer of the bulk region is activated to form another layer of the bulk region only once all the other printing heads comprising a modeling material have been activated to form a layer of the bulk region. In some other embodiments, the specific sequence is a random order.

In some embodiments, the controller is further configured to activate printing heads to form a support construction for supporting the 3D object during printing. In some embodiments, the controller is configured to activate a printing head dispensing a modeling material to form a portion of said support construction. In some embodiments, the controller is configured to activate a printing head to deposit a building material at a location outside of the 3D object and the support construction. In some embodiments, the location is a location on the printing tray where no 3D object is printed, a purging station and/or a service station.

These, additional, and/or other aspects and/or advantages of the present invention are set forth in the detailed description which follows; possibly inferable from the detailed description; and/or learnable by practice of the present invention.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data.

Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing", "deriving" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In certain embodiments, illumination technology may comprise, electromagnetic radiation in the visual range, ultraviolet or even shorter wave radiation such as x rays, and possibly even particle beams.

According to embodiments of the present invention, 3D objects are formed by depositing one or more building material, layer by layer, in a pattern corresponding to the shape of the objects as defined by a CAD system. The term 'object' refers to a whole 3D object or a part of an object.

Each layer of the object is formed by an additive manufacturing system, more specifically a 3D inkjet printing apparatus having a plurality of inkjet printing heads, via which droplets of building materials are deposited on a building tray or building surface (e.g. previous layer of an object being printed), according to a computer image of the object. The decision whether or not to deposit a droplet in a given location, and which type of building material is to be deposited in said given location is made according to a computer image of the layer of the object currently being printed, and according to the desired properties of the object.

Each building material is deposited from a separate printing head having one or more preferably longitudinal arrays of nozzles for inkjet deposition of the material. In some embodiment a printing head may have more than one array of nozzles, and more than one building materials may be dispensed from a different array of nozzles within the same printing head.

The term "building materials" as used herein refers to two major types of material for inkjet deposition: modeling material and support material. The modeling material is generally a material which is intended to form at least part of the 3D object and optionally part of one or more support constructions for the 3D object, e.g., to provide a support construction with further strength. A typical modeling material may typically be able to form a 3D object on its own, without being combined with another material, or may be combined with another material to provide a 3D object or part of a 3D object having pre-defined properties. The support material is generally a material which is intended to form at least part of a support construction for supporting the object, object parts or subsequent layers of the object in the course of printing, e.g. overhangs or hollows in the 3D object.

The modeling material, support material and/or combinations of modeling materials and/or combinations of modeling material and support material are typically hardened or solidified, e.g., cured, following deposition, to provide a layer or the 3D object being printed. According to embodiments of the present invention, the building materials typically being deposited are photocurable materials, e.g., photopolymers, and curing of the photocurable materials is by exposure to UV light after droplet deposition. Methods and systems of 3D printing as aforementioned are well-known to those skilled in the art of additive manufacturing.

When printing 3D objects using a plurality of different building materials, e.g., a plurality of different modeling materials, and particularly for lengthy print jobs, e.g., printing large and/or complex objects, the required geometry or properties of the final 3D object being printed may leave some printing head nozzles or arrays of nozzles inactive (e.g., not depositing material) for relatively long periods during the course of printing, while other nozzles or arrays of nozzles continue to deposit materials required for printing during the same time frame. When inkjet printing heads, e.g., inkjet nozzles are inactive e.g., idle for a period of time during operation of the system, e.g., during a printing job, the nozzles are at risk of becoming clogged, e.g., due to UV light reflecting back to the nozzle arrays from the printing surface, or because of dirt accumulation in and/or around idle nozzle apertures.

Nozzle clogging or blocking necessitates halting jobs during printing for head maintenance and/or calibration, when previously unused heads need to be re-operated, e.g., printing head purging and/or wiping sequences, and an increase in the frequency of such maintenance sequences (e.g., every 15 min., instead of every 30 min. for frequently operating heads). In general, repeated clogging results in a reduction of printing head lifetime and increased expenditure on system maintenance, e.g. due to accumulated costs of material purges via the nozzles and/or printing head replacement.

As 3D printing systems become larger and more complex, and include more printing heads for more material types and larger printing jobs, some printing heads are expected to have longer idle periods, thus the problem of repeated printing head nozzle blocking is expected to increase in severity and frequency.

According to embodiments of the present invention, systems and methods of 3D printing are provided, which deposit building material(s), e.g., modeling material(s), layer by layer via multiple printing heads, to form a 3D object having a bulk and a surface layer, wherein at least the surface layer of the object is deposited according to a given CAD model of the 3D object being printed. During deposition of the materials, the systems and methods of the present invention provide switching of building material deposition between different printing heads in order to ensure operation of each of the printing heads at least once within a specified time period such as a minute or less and/or operation of otherwise idle printing heads for deposition of building material(s) in regions which do not affect the external appearance or properties of the final 3D object, such as within the bulk of the object.

According to embodiments of the present invention, systems and methods of 3D printing are provided, which deposit building material(s), e.g., modeling material(s), layer by layer via multiple printing heads, to form a 3D object having a bulk, a surface layer and one or more supporting constructions, wherein at least the surface layer of the object is deposited according to a given CAD model of the 3D object being printed. During deposition of the materials, systems and methods of the present invention provide switching of deposition between different printing heads in order to ensure operation of each of the otherwise idle printing heads at least once within a specified time period such as a minute or less, for building material deposition in regions which do not affect the external appearance or properties of the object, such as when depositing building materials to form the bulk of the object and/or when depositing building materials to form support constructions for the object, which support constructions are subsequently, e.g., after the printing job is complete, removed or separated from the printed 3D object.

According to embodiments of the present invention, printing heads that would otherwise be idle for relatively long period during a printing job may be operated in locations where the CAD model of the 3D object and support constructions do not require or specify their operation. Such printing head operation and consequently building material deposition is carried out in regions which do not affect the resulting 3D object's external features, quality and/or properties, such as deposition within an internal bulk area of the 3D object, within a support construction which is later removed, i.e. separated from the object after printing.

In an additional embodiment, otherwise idle printing heads may be operated to deposit building material outside of the footprint of the 3D model and its support constructions, e.g., at another pre-determined location on the printing tray or surface, thus ensuring operation of each of the printing heads at least once within a specified time period such as a minute or less.

Frequent operation of all printing heads during or between printing jobs ensures their continuing operability and increases their lifetime, while not affecting the quality of the final 3D printed object. It allows extending the time between printing head maintenance operations, and in general reduces the need and frequency for printing head replacement, further increasing the economic viability of the printers.

Figure 1:
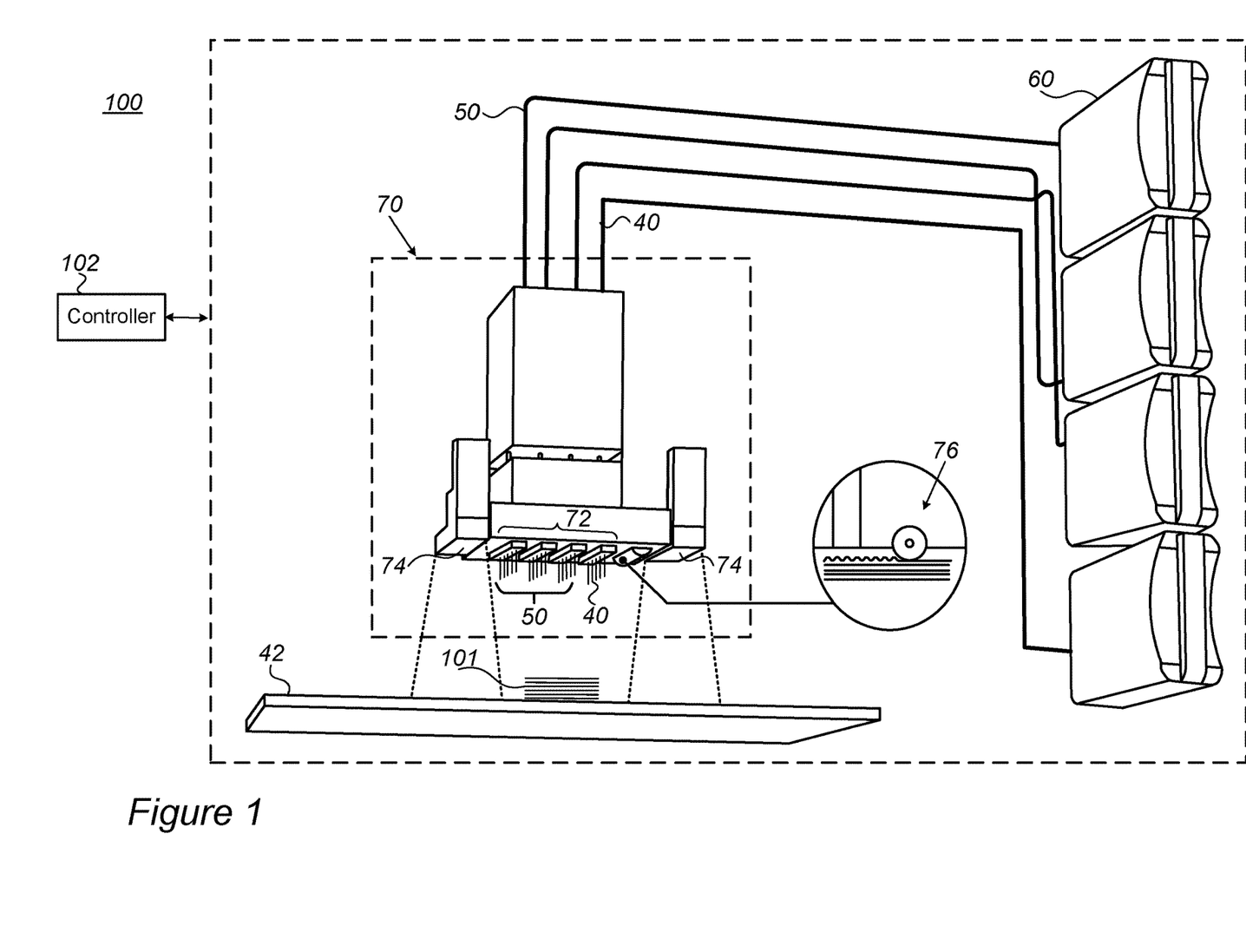
FIG. 1 is a schematic illustration of a 3D printing system, according to some embodiments of the invention.

FIG. 1 is a schematic illustration of a 3D-printing system 100, according to some embodiments of the invention. 3D-printing system 100 comprises a plurality of printing heads 72 configured to deposit one or more modeling materials 50 (e.g., supplied from cartridges 60), layer by layer and controllable by a controller 102. Controller 102 may be associated with and/or part of 3D-printing system 100. 3D-printing system 100 may comprise other additional functional elements, such as ultraviolet (UV) curing lamps 74, roller leveling apparatus 76, etc., incorporated into a printing assembly or block 70. 3D-printing system 100 may comprise further cartridges and printing heads for additional materials, such as support material 40. Controller 102 is further configured to switch among printing heads 72 during the deposition of building material(s) in order to operate each of printing heads 72 at least once within a specified period (indicated schematically by numeral 115 in FIG. 4), in order to prevent clogging of printing heads 72 and/or their printing head nozzles due to lack of use thereof while other printing heads 72 are in use for an extended time. For example, controller 102 and/or 3D-printing system 100 may be configured to switch at least one first printing head depositing at least one first modeling material with at least one second, different printing head depositing at least one second, same or different modeling material—to accomplish the operation of each of the printing heads at least once within the specified period, anytime during the printing of 3D object 101.

Figure 2:
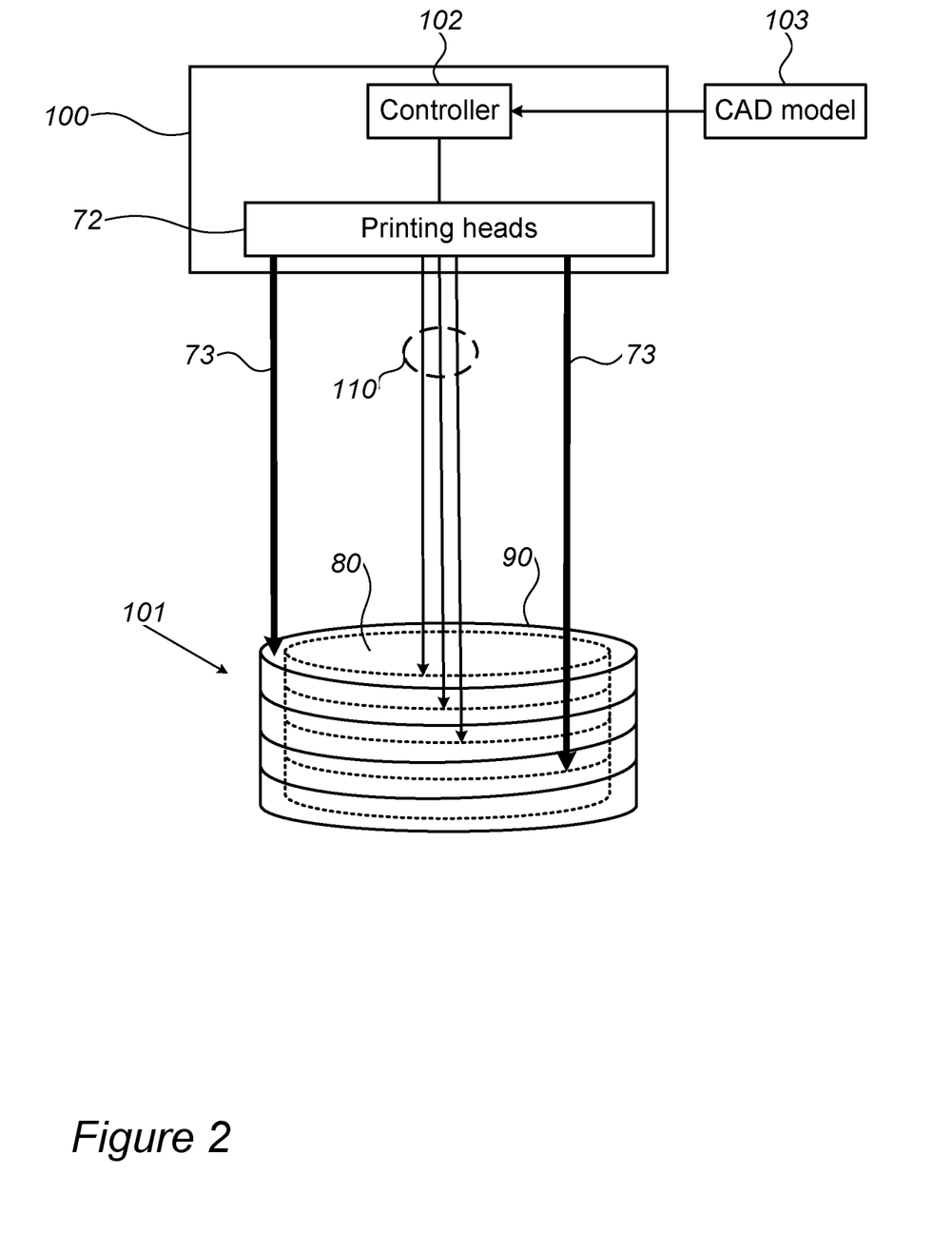
FIG. 2 is a schematic illustration of a 3D object printed by a 3D inkjet printing system, according to some embodiments of the invention.

FIG. 2 is a high-level schematic illustration of a 3D object 101 printed by 3D-printing system 100, according to some embodiments of the invention. 3D-printing system 100 comprises a plurality of printing heads 72 configured to deposit one or more building materials, layer by layer, and controllable by a controller 102, to form a 3D object comprising a surface layer or region 90 and a bulk region 80.

In certain embodiments, CAD model 103 may be modified to include occasional and/or periodic deposition 110 by otherwise idle printing heads 72 during a printing job, to ensure frequent or periodic jetting by each and every printing head 72, even if the object being printed does not require the material in a given head to be jetted and thus does not require use of the given printing head for an extended period of time.

For example, while controller 102 is typically configured to form surface 90, bulk 80 and optionally support constructions (not shown), according to a given CAD model 103, by controlling deposition 73 of selected building material(s) from selected printing heads 72, those printing heads 72 which are not required for forming surface 90, bulk 80 and/or support constructions remain idle for an extended time during the printing job defined by CAD model 103, and thus the nozzles of the idle printing heads are susceptible to clogging by reflection of UV light from the printing surface and/or accumulation of dirt during the time they remain idle.

In embodiments of the present invention, controller 103 is configured to switch between printing heads, so as to operate such idle printing heads intermittently during the course of the printing job to deposit 110 building material(s) into bulk 80, or into a support construction, and/or at a predefined location(s) on the printing tray outside of the footprint of the 3D model and its support constructions.

Figure 3:
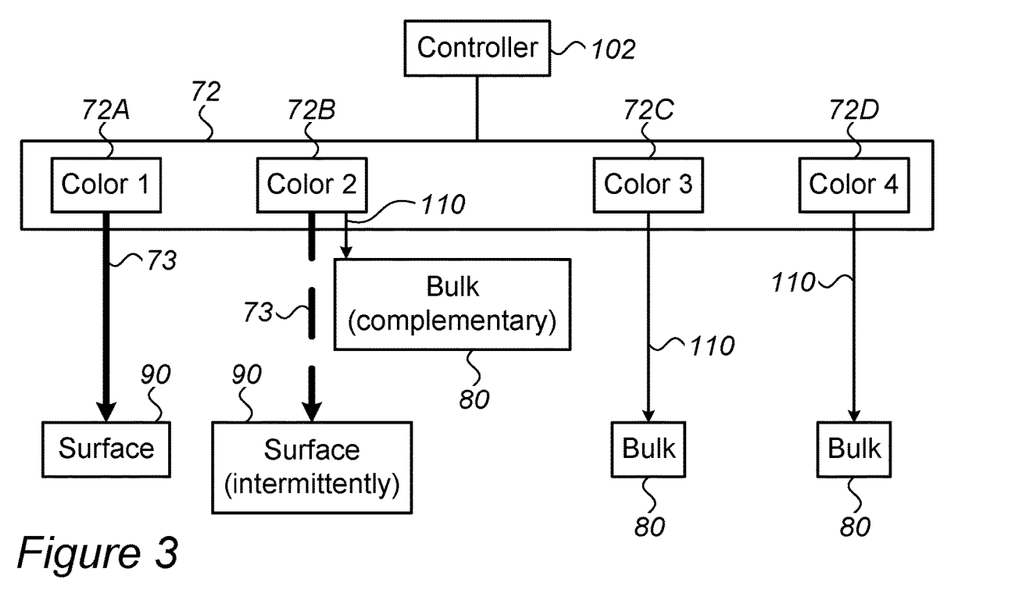
FIG. 3 is a schematic illustration of a process of switching between printing heads, according to some embodiments of the invention.

FIG. 3 a is a schematic illustration of a process of switching between printing heads 72, according to some embodiments of the invention. For example, one or more printing heads 72 may be operated frequently during building material deposition 73 to form the surface layer or region 90 and bulk 80 of the 3D object according to CAD model 103 (e.g., printing head 72A used to deposit a given modeling material to form surface 90 of the 3D object), while one or more of printing heads 72 may be operated less frequently according to CAD model 103 (e.g., printing head 72B used to deposit another modeling material for forming part of the surface and part of the bulk), and yet one or more other printing heads 72 may not be operated at all for an extended period of time during the printing job according to the requirements of CAD model 103 (e.g., printing heads 72C, 72D). In certain embodiments, controller 102 is configured to operate each of printing heads 72 at least once within a specified time period 115, (indicated schematically by numeral 115 in FIG. 4), e.g., less than 5 minutes, less than 1 minute and/or less than 30 seconds. For example, printing head 72B may be operated to deposit modeling material to form bulk 80 and printing heads 72C and 72D may be operated periodically to deposit building material(s) 110 to form bulk 80 as well, even though deposition of materials therefrom is not necessarily specified by CAD model 103.

In certain embodiments, the different materials deposited by printing heads 72A-72D may be different colored modeling materials, as illustrated in a non-limiting manner in FIG. 3. In certain embodiments, the materials deposited by printing heads 72A-72D may provide different modeling materials, having different chemical and/or mechanical properties. Optionally, one of the materials may be deposited by more than one printing heads 72A-72D, e.g., deposition of the same material by more than one printing head.

Figure 4:
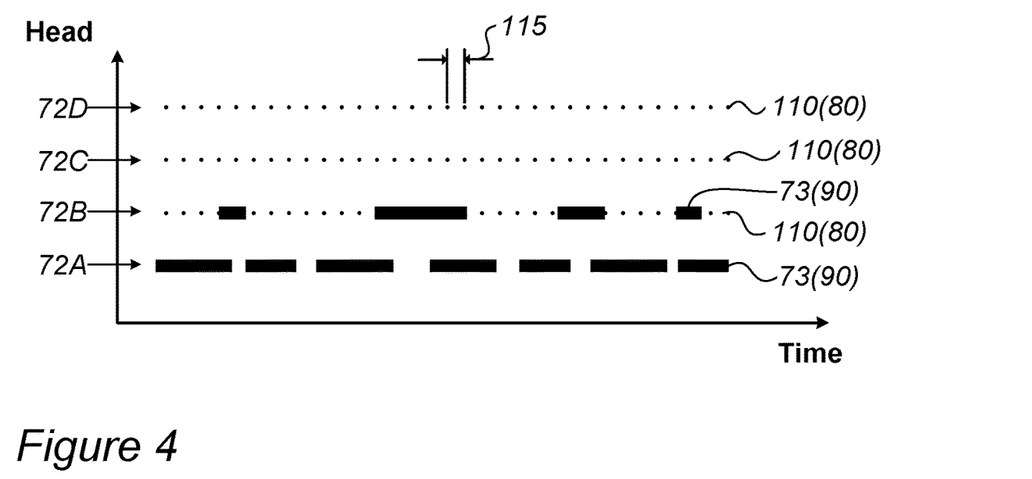
FIG. 4 is a graph showing an example of printing heads operation over a period of time, according to some embodiments of the invention.

FIG. 4 is a graph showing an example of printing heads operation over a period of time, according to the configuration as described for FIG. 3, showing the relative operation and lack thereof of printing heads 72A-D over time, and specifically during a given time period 115, as required by the CAD model 103 of the object being printed, without switching of printing heads as described herein.

In certain embodiments, operating all heads may be implemented by modifying the CAD model prior to printing, e.g., during the slicing procedure of the 3D object model into layers, to include random deposition e.g., 'firing' or 'jetting' of different materials from different printing heads to form bulk 80 by switching to a printing head 72 that might otherwise remain idle for a period of time during the printing job, regardless of the material being deposited by them.

In one embodiment, and in order to maintain printing head stability, the CAD model may be modified to define slices within the bulk such that each of the different printing heads operates on a per slice basis, e.g., each head deposits a whole bulk slice, as opposed to individual firings of droplets from a printing head within a given slice. Thus, in one embodiment, each printing head (PH) will print one or more slices of the bulk, one after the other. For example, a system printing with two modeling materials (white and black) will print in the bulk one or more slices of white modeling material, and one or more slices of black modeling material. In this case, printing head idle time is $1*n*t$, n being the number of slices printed with the previous material, and t the time taken to print the previous slice(s); and for systems printing with 7 modeling materials, each printing head may print in the bulk at least one slice at a time (PH1—one slice, PH2—one slice . . . PH7—one slice, followed by PH1—one slice, and so on). In this case, idle time should be $N*n*t$, with N being the number of modeling materials, n the number of slices printed with one material, and t the time to print the previous $N*n$ slice(s), depending on the geometry of the object being printed. In some specific embodiments, the idle times for each printing heads are more or less equal. For example, when due to the geometry of the object being printed, a given slice of the bulk has a small surface area, a printing head configured to print a small slice will print more slices than another printing head printing a larger slice, such that the idle time will remain equivalent between the different printing heads. Configuration and order of printing head operation per slice may be determined by modifying the CAD model prior to printing. Alternatively, the order of printing head operation per slice may be determined during the course of the printing job, according to object geometry.

In certain embodiments, operating all heads may be implemented at the printer level, without prior modification of the CAD model, by switching printing heads 72 during deposition of bulk 80.

As described hereinabove, in certain embodiments, printing heads 72 may be operated to deposit building material(s) at a different location other than within bulk 80, e.g., into a support construction of 3D object 101, in addition to support material 40, or onto specified locations on printing tray 42. In the former case, deposition may be carried out in support regions which are distant from the interface between the support construction and object 101, e.g., within the bulk of the support construction, in order to avoid negatively affecting the surface appearance and/or properties of the final 3D object after support construction removal. In any case, whether depositing building material(s) in bulk 80 or in a support region, deposition regions may be pre-defined, so as not to negatively affect the surface properties, e.g., geometry, fine detail, properties, and/or the color(s) of final 3D object 101.

Figure 5:
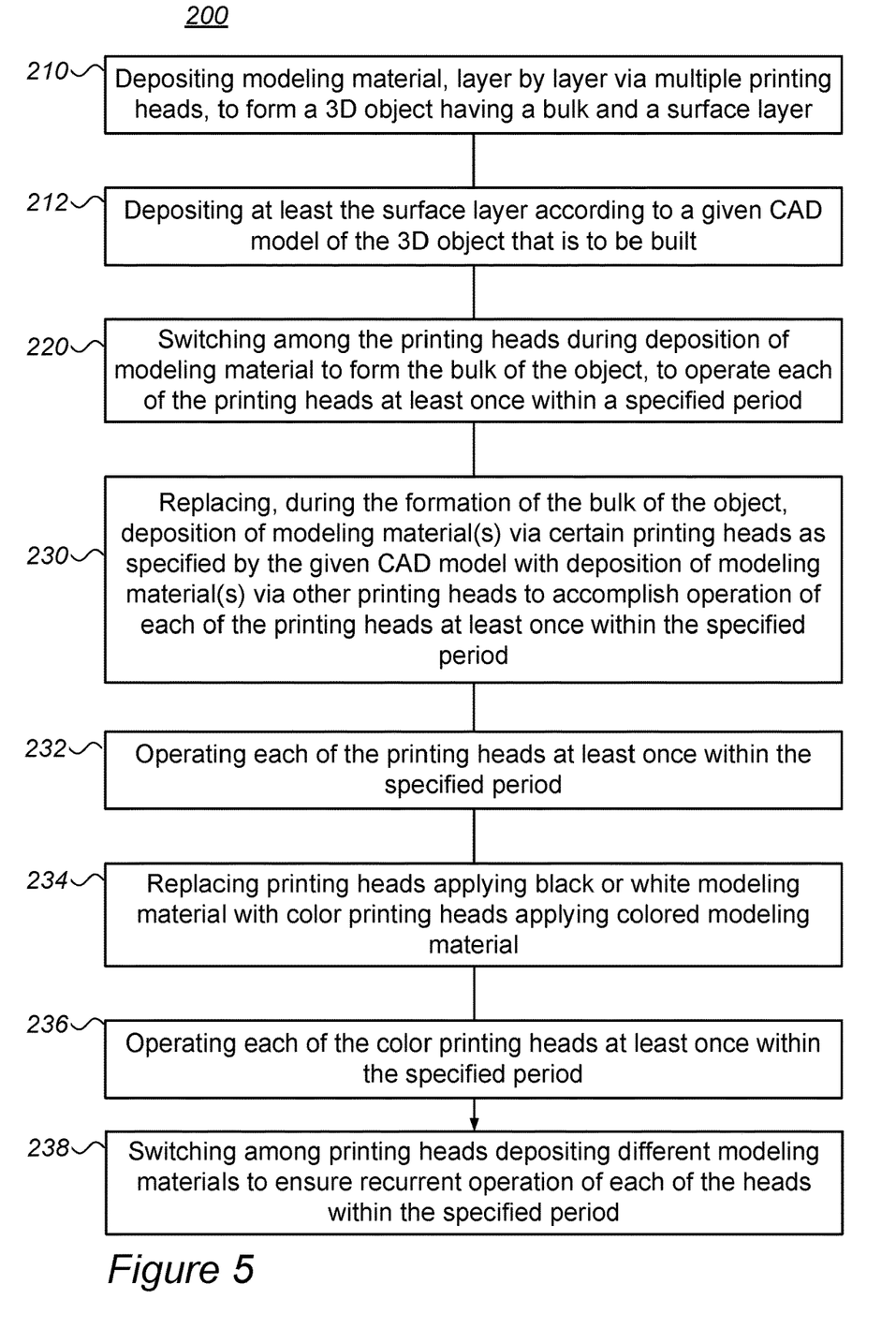
FIG. 5 is a flowchart illustrating a method of switching between printing heads, according to some embodiments of the invention.

FIG. 5 is a flowchart illustrating an exemplary method 200, according to some embodiments of the invention. The method steps may be carried out with respect to 3D-printing system 100 described above, which may optionally be configured to implement method 200. Method 200 may be at least partially implemented by at least one computer processor, e.g., in a metrology module. Certain embodiments comprise computer program products comprising a computer readable storage medium having computer readable program embodied therewith and configured to carry out the relevant steps of method 200. Certain embodiments comprise implementing method 200 in 3D printing system 100, e.g., in controller 102 and/or in an external module in communication therewith. Method 200 may comprise the following steps, irrespective of their order.

Method 200 of 3D printing comprises depositing modeling material, layer by layer by a plurality of printing heads, to form a 3D object having a bulk and a surface layer (step 210), wherein at least the surface layer is deposited according to a given CAD model of the 3D object to be built (step 212), and, during deposition of modeling material to form the bulk of the object, switching among the printing heads to operate each of the printing heads at least once within a specified period (step 220) during a printing job.

In certain embodiments the given CAD model may further relate to at least a part of the bulk, and method 200 may further comprise, during the formation of the bulk of the object, replacing deposition of one or more building material(s) via certain printing heads as specified by the given CAD model with deposition of building material/s via other printing heads to accomplish operation of each of the printing heads at least once within the specified period (step 230) and/or operating each of the printing heads at least once within the specified period (step 232). In certain embodiments for example, method 200 may comprise replacing printing heads applying black or white modeling material with printing heads applying colored modeling material (step 234), to accomplish the operation of each of the printing heads at least once within the specified period, and/or operating each of the colored modeling material printing heads at least once within the specified period (step 236). Method 200 may comprise switching among printing heads depositing different modeling materials (e.g., switching at least one first printing head depositing at least one first modeling material with at least one second, different printing head depositing at least one second, same or different modeling material) to ensure recurrent operation of each of the heads within the specified period (step 238). The modeling materials may differ in any characteristic or property, such as chemical composition, color, mechanical properties, etc., and in case several printing heads are configured to deposit the same building material, these heads are also switched to ensure activation of each of the printing heads within the specified period. In various embodiments, the specified period may be any of: less than 5 minutes, less than 1 minute and less than 30 seconds. In some embodiments, all the printing heads are activated at least once to deposit building materials during a scan (or pass) of the printing block over the tray. In some other embodiments, all the printing heads are activated at least once to deposit building materials in the same layer. In some embodiments, a printing head is activated by having all its nozzles depositing building material. In some other embodiments, for instance when the selected printing head possesses more than one nozzle array (e.g. multiple channel printing head), a printing head is activated by having at least one nozzle array depositing building material.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A three-dimensional (3D) printing system comprising:
a controller, and
printing heads comprising one or more nozzle arrays,
wherein said printing system being configured to form a 3D object by depositing a building material, layer by layer, wherein said controller is configured to activate each of said printing heads to dispense the building material at least once within a specified period of time during said printing,
wherein said 3D object comprises a bulk region and a surface region, wherein said controller is configured to activate said printing heads to deposit the building material to form a portion of said bulk region according to data provided by a CAD file, and wherein said controller is configured to activate said printing heads to deposit the building material to form another portion of the bulk region without relating to said data.

2. The 3D printing system of claim 1, wherein said controller is configured to activate all of the nozzles of a printing head.

3. The 3D printing system of claim 1, wherein said controller is configured to activate at least part of the nozzles of a printing head.

4. The 3D printing system of claim 1, wherein said controller is configured to activate a nozzle array of a printing head.

5. The 3D printing system of claim 1, wherein said specified period of time is the time necessary for a printing block comprising said printing heads to perform a full scan or pass over a building tray.

6. The 3D printing system of claim 1, wherein said specified period of time is the time necessary to build one layer of said 3D object.

7. The 3D printing system of claim 1, wherein said specified period of time is the time necessary to build a specific number of layers of said 3D object, and wherein said specific number of layers is equal to or less than a total number of said printing heads.

8. The 3D printing system of claim 1, wherein said specified period of time is the time necessary to build a specific number of layers of said 3D object, and wherein said specific number of layers is equal to or less than a total number of said nozzle arrays.

9. The 3D printing system of claim 1, wherein said specified period of time is the time necessary to build said 3D object.

10. The 3D printing system of claim 1, wherein said specified period of time is less than 5 minutes.

11. The 3D printing system of claim 1, wherein said 3D object comprises a bulk region and a surface region, wherein said controller is configured to activate said printing heads to deposit the building material to form said surface region according to data provided by a CAD file, and wherein said controller is configured to activate said printing heads to deposit the building material to form the bulk region so that each of said printing heads is activated at least once within a specified period of time.

12. The 3D printing system of claim 1, wherein said 3D object comprises a bulk region and a surface region, wherein said printing heads include a printing head comprising a support material and a plurality of printing heads comprising a modeling material, and wherein said controller is configured to activate each of said printing heads comprising the modeling material to form a layer of said bulk region.

13. The system of claim 12, wherein each of said printing heads comprising the modeling material is activated according to a specific sequence, and wherein said specific sequence is a serial order so that each of the printing heads activated to form a layer of the bulk region is activated to form another layer of the bulk region only once all other printing heads comprising the modeling material have been activated to form a layer of the bulk region.

14. The system of claim 12, wherein each of said printing heads comprising the modeling material is activated according to a specific sequence, and wherein said specific sequence is a random order.

15. The 3D printing system of claim 1, wherein said controller is further configured to activate the printing heads to form a support construction for supporting the 3D object during printing.

16. The 3D printing system of claim 15, wherein said controller is configured to activate a printing head dispensing a modeling material to form a portion of said support construction.

17. The 3D printing system of claim 15, wherein said controller is configured to activate at least one of the printing heads to deposit the building material at a location outside of the 3D object and the support construction.

18. The 3D printing system of claim 17, wherein said location is a location on a printing tray where no 3D object is printed.

19. The 3D printing system of claim 17, wherein said location is a purging or service station.

* * * * *